US012100543B2

(12) United States Patent
Wang et al.

(10) Patent No.: US 12,100,543 B2
(45) Date of Patent: Sep. 24, 2024

(54) MOLDED-FORMING POWER INDUCTOR AND MANUFACTURING METHOD THEREOF

(71) Applicant: Shenzhen Sunlord Electronics Co., Ltd., Guangdong (CN)

(72) Inventors: Yingying Wang, Guangdong (CN); Xinshu Yu, Guangdong (CN); Shengcheng Xia, Guangdong (CN); Youyun Li, Guangdong (CN); Xin Che, Guangdong (CN)

(73) Assignee: Shenzhen Sunlord Electronics Co., Ltd., Shenzhen (CN)

( * ) Notice: Subject to any disclaimer, the term of this patent is extended or adjusted under 35 U.S.C. 154(b) by 686 days.

(21) Appl. No.: 17/238,224

(22) Filed: Apr. 23, 2021

(65) Prior Publication Data

US 2021/0304956 A1 Sep. 30, 2021

Related U.S. Application Data

(63) Continuation of application No. PCT/CN2020/101831, filed on Jul. 14, 2020.

(30) Foreign Application Priority Data

Mar. 30, 2020 (CN) ........................ 202010237414.1

(51) Int. Cl.
*H01F 27/28* (2006.01)
*H01F 27/24* (2006.01)
(Continued)

(52) U.S. Cl.
CPC ........... *H01F 27/346* (2013.01); *H01F 27/24* (2013.01); *H01F 27/29* (2013.01); *H01F 27/33* (2013.01);
(Continued)

(58) Field of Classification Search
CPC ........ H01F 27/346; H01F 27/24; H01F 27/29; H01F 27/33; H01F 27/2828; H01F 27/2852; H01F 27/324; H01F 27/255
(Continued)

(56) References Cited

U.S. PATENT DOCUMENTS

2010/0013587 A1* 1/2010 Yan ........................ H01F 17/04 29/606
2015/0123605 A1* 5/2015 Hyun ...................... H01F 27/36 336/200

(Continued)

FOREIGN PATENT DOCUMENTS

CN 1949411 4/2007
CN 201051434 4/2008

(Continued)

*Primary Examiner* — Shawki S Ismail
*Assistant Examiner* — Kazi S Hossain
(74) *Attorney, Agent, or Firm* — Winston Hsu

(57) ABSTRACT

A molded-forming power inductor comprises a conductor, a magnetic core and a magnetic molding package layer, wherein the conductor comprises an integrally formed insulation-processed base part, an insulation-processed side enclosing part and an electrode part, the base part and the side enclosing part are assembled with the magnetic core in a gapless fit mode, and the magnetic molding package layer is gaplessly wrapped outside the conductor and the magnetic core. A method is provided for manufacturing the molded-forming power inductor. The molding package layer completely covers the prefabricated magnetic core and a part of the conductor except the electrode, the structure is integrally formed, and the leakage magnetic flux is less; when the equivalent magnetic permeability is 60 or more, the equivalent saturation magnetic flux density can be 0.55 T or higher; and the space utilization rate is high to facilitate miniaturization of an inductor design.

3 Claims, 4 Drawing Sheets

(51) Int. Cl.

| | |
|---|---|
| ***H01F 27/29*** | (2006.01) |
| ***H01F 27/33*** | (2006.01) |
| ***H01F 27/34*** | (2006.01) |
| ***H01F 41/02*** | (2006.01) |
| ***H01F 41/04*** | (2006.01) |

(52) U.S. Cl.
CPC ......... *H01F 41/0246* (2013.01); *H01F 41/04* (2013.01)

(58) Field of Classification Search
USPC ........................................... 336/221, 192, 83
See application file for complete search history.

(56) References Cited

U.S. PATENT DOCUMENTS

2019/0326046 A1* 10/2019 Ashizawa ............. H01F 27/306
2020/0043643 A1* 2/2020 Yan ....................... H01F 27/306

FOREIGN PATENT DOCUMENTS

| | | |
|---|---|---|
| CN | 202887902 | 4/2013 |
| CN | 105914008 | 8/2016 |
| CN | 108389679 | 8/2018 |
| JP | 2006286658 | 10/2006 |

* cited by examiner

MOLDED-FORMING POWER INDUCTOR AND MANUFACTURING METHOD THEREOF

CROSS REFERENCE TO RELATED APPLICATIONS

This application is a continuation application of PCT/CN2020/101831 filed on 2020 Jul. 14, which claims priority to CN patent application NO. 202010237414.1 filed on 2020 Mar. 30. The contents of the above-mentioned application are all hereby incorporated by reference.

BACKGROUND OF THE INVENTION

1. Field of the Invention

The invention relates to the technical field of molded forming, in particular to a molded-forming power inductor and a manufacturing method thereof.

2. Description of the Prior Art

Due to its ultra-thin shape, excellent high current characteristics and ultra-high stability, an integrated inductor in electronic components has a demand exceeding supply in automotive electronics, artificial intelligence, 5G and other fields. In the production process of the traditional powder integrated forming inductor, the coil spot welding technology is mainly adopted, and the phenomena of virtual welding and missed welding can occur. In addition, in the compression molding forming process, the coil and the welding spot are manufactured in a cold pressing or hot pressing mode; and the pressure intensity is 900 MPa or above, the welding spot, a coil film and a magnetic powder insulating layer are easily damaged, and the phenomena of open circuit and short circuit are easy to occur.

According to the high-reliability compression molding forming process in the prior art, a high pressure in the process may deform the conductor; moreover, the conductor is too wide, the adhesive force between the magnetic particles is insufficient, and the magnet is easy to crack. Furthermore, electrodes are led out from two sides of the magnet, the side electrodes are positioned outside the magnet, and the volume of the magnet cannot be fully utilized.

In the prior art of magnetic core perforation, with the development trend of miniaturization and thinning of the power inductor and the limitation of the processing technology level of the magnetic core, the automatic production process is difficult and high in cost.

According to the traditional combined magnetic core type power inductor, a ferrite magnetic core is adopted, glue is coated on the surface thereof, and a gap exists between a conductor and the magnetic core. Therefore, the leakage magnetic flux is large, and it is easy to produce a sound.

The prior art lacks an integrated forming inductor with small forming pressure and simple process.

The disclosure of the background art above is only used for assisting in understanding the inventive concept and technical solution of the present invention, and does not necessarily belong to the prior art of the present patent application. Insofar as there is no explicit evidence that the above-mentioned contents have been disclosed before the filing date of the present patent application, the above-mentioned background art should not be used for evaluating the novelty and inventive step of the present application.

SUMMARY OF THE INVENTION

The invention aims to solve the problems in the prior art, and provides a molded-forming power inductor and a manufacturing method thereof.

In order to solve the problems, the technical solution adopted by the invention is as follows.

The invention provides a molded-forming power inductor, comprising a conductor, a magnetic core and a magnetic molding package layer, wherein the conductor comprises an integrally formed insulation-processed base part, an insulation-processed side enclosing part and an electrode part, the base part and the side enclosing part are assembled with the magnetic core in a gapless fit mode, and the magnetic molding package layer is gaplessly wrapped outside the conductor and the magnetic core.

Preferably, the conductor has a Q shape; the magnetic core is a cuboid, the base is positioned on a groove body at the upper surface of the cuboid, the side enclosing parts are respectively positioned on the groove bodies at the first side face and the second side face of the cuboid opposite to each other, the lower surface of the electrode part is coplanar with the lower surface of the magnetic core, and the electrode part respectively extends away from the first side face and the second side face.

Preferably, the conductor has an arcuate shape; the magnetic core is a cuboid, the base part is positioned on a groove body at the upper surface of the cuboid, the side enclosing parts are respectively positioned on the groove bodies at the first side face and the second side face of the cuboid opposite to each other, the lower surface of the electrode part is coplanar with the lower surface of the magnetic core, and the electrode part extends away from the third side face and the fourth side face respectively.

Preferably, the conductor has a U shape; the magnetic core is a cuboid, the base part and the side enclosing part are positioned on the groove body at the upper surface of the cuboid, and the electrode part extends away from the cuboid.

Preferably, a tin layer having a thickness of 3-8 μm is included outside the electrode part; or a nickel layer having a thickness of 0.3-1.3 μm and a tin layer having a thickness of 6-8 μm are sequentially included outside the electrode part.

Preferably, the magnetic core is a metal material, and the magnetic molding package layer is a metal material; or the magnetic core is a ferrite material, and the magnetic molding package layer is a metal material.

The invention also provides a method for manufacturing a molded-forming power inductor, comprising the steps of: S1, prefabricating a conductor including an integrally formed insulation-processed base part, an insulation-processed side enclosing part, and an electrode part; S2, prefabricating a magnetic core and arranging the conductor on the prefabricated magnetic core; and S3, covering the magnetic core, and the base part and the side enclosing part of the conductor with the magnetic molding package layer by a molded-forming process, wherein the forming pressure is lower than 300 MPA, and an organic layer of the magnetic molding package layer is cured by baking over 100° C. for 1 hour or more.

Preferably, the magnetic core is manufactured by a compression molding or injection molding process.

Preferably, arranging the conductor on the magnetic core comprises assembling the base part, the side enclosing part and the magnetic core in a gapless fit mode, wherein the lower surface of the electrode is coplanar with the lower surface of the magnetic core.

Preferably, a center post of the magnetic core is slotted, and the size of a slot body is matched with the conductor.

The invention has the beneficial effects that it provides a molded-forming power inductor and a manufacturing method thereof. By means of the design of combined magnetic core structure without core gaps, the molding package layer completely covers the prefabricated magnetic core and a part of the conductor except the electrode, the structure is integrally formed, and the leakage magnetic flux is less; when the equivalent magnetic permeability is 60 or more, the equivalent saturation magnetic flux density can be 0.55 T or higher; and the space utilization rate is high to facilitate miniaturization of an inductor design.

Further, the electrode is a part of the conductor, and there is no risk of open and short circuits. The conductor is assembled on the magnetic core, the magnetic molding package layer is formed in a molding mode to wrap a built-in magnetic core assembly, the prefabricated magnetic core is low in bearing pressure and not easily damaged, and the conductor is not easy to shift and deform. Moreover, the bonding force between the magnetic molding package layer and the magnetic core assembly is high, no air gap exists between an inner magnetic medium and an outer magnetic medium, a high inductance value and a high direct current superposition performance can be maintained under the condition of large current, noise is hardly generated at high frequency, and the reliability is high.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
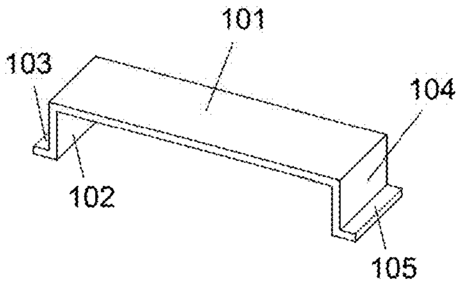
FIG. 1A is a structurally schematic view of a Q-shaped conductor according to an embodiment of the present invention.

In order that the technical problems, technical solutions and advantages to be solved by the embodiments of the present invention can be more clearly understood, the present invention will be described in further detail with reference to the accompanying drawings and embodiments. It should be understood that the specific embodiments described herein are merely illustrative of the present invention and are not intended to be limiting thereof.

It should be noted that when an element is referred to as being “fixed to” or “disposed on” another element, it can be directly or indirectly on the other element. When an element is referred to as being “connected” to another element, it can be directly or indirectly connected to the other element. In addition, connections may be used as a fixed function or a circuit communication function.

It should be understood that the terms “length”, “width”, “upper”, “lower”, “front”, “rear”, “left”, “right”, “vertical”, “horizontal”, “top”, “bottom”, “inner”, “outer”, and the like, refer to orientations or positional relationships based on the orientations or positional relationships shown in the drawings. It is merely convenient to describe the embodiments of the invention and to simplify the description, rather than to indicate or imply that a device or element referred to must have a particular orientation, be constructed and operated in a particular orientation, and thus should not be construed as limiting the invention.

Furthermore, the terms “first” and “second” are used for descriptive purposes only and are not to be construed as indicating or implying relative importance or implicitly indicating the number of technical features indicated. Thus, features defining “first” and “second” may explicitly or implicitly include one or more such features. “A plurality of” means two or more, unless specifically defined otherwise, in the description of the embodiments of the invention.

The invention provides a molded-forming power inductor, comprising a conductor, a magnetic core and a magnetic molding package layer, wherein the conductor comprises an integrally formed insulation-processed base part, an insulation-processed side enclosing part and an electrode part, the base part and the side enclosing part are assembled with the magnetic core in a gapless fit mode, and the magnetic molding package layer is gaplessly wrapped outside the conductor and the magnetic core.

As shown in FIGS. 1A-1D, the conductor 10 has a Q shape; the conductor 10 comprises an integrally formed insulation-processed base part 101, insulation-processed side enclosing parts 102 and 104, and electrode parts 103 and 105, wherein the magnetic core 20 is a cuboid, the base part 101 and the side enclosing parts 102 and 104 are assembled with the magnetic core 20 in a gapless fit mode, the magnetic molding package layer 40 is gaplessly wrapped outside the conductor 10 and the magnetic core 20, and only the electrode part 103, 105 of the conductor 20 is exposed outside.

Specifically, the base part 101 is positioned on a groove body at an upper surface of the cuboid of the magnet 20, the side edge enclosing parts 102 and 104 are respectively provided with groove bodies at a first side face and a second side face of the cuboid opposite to each other, lower surfaces of the electrode parts 103 and 105 are coplanar with a lower surface of the magnetic core 20, and the electrode parts 103 and 105 respectively extend away from the first side face and the second side face. It will be appreciated that in order to increase the length of the conductor 10 on the core 20, the base part 101 of the conductor 20 is in a groove body in the length direction of the cuboid. The magnet 20 typically has a thickness of 0.2 mm or less, and is provided with a small forming pressure if the width-to-thickness ratio is greater than 10.

The inductor magnet is a structure design with a combined magnetic core without a magnetic core gap, and the equivalent number of turns of the inductor is 0.8-1.0.

In an embodiment of the invention, the conductor can be a bare copper wire, a tinned copper wire and a metal sheet, and the shape can be U-shaped, Q-shaped and arcuate, and can be arbitrarily changed according to specific electrical requirements. In an embodiment, the conductor 10 is a flat wire, such as a sheet of metal, or a round wire, or a metal terminal, and can be formed by bending, and also by forging or stamping. Thereafter, the base part 101 and the side enclosing parts 102 and 104 are subjected to an insulation process, and the electrode parts 103 and 105 are subjected to matte-tin with a tin layer thickness of 3-8 μm. In another embodiment of the present invention, a nickel layer having a thickness of 0.3 to 1.3 μm and a tin layer having a thickness of 6 to 8 μm are sequentially included outside the electrode part.

Figure 1B:
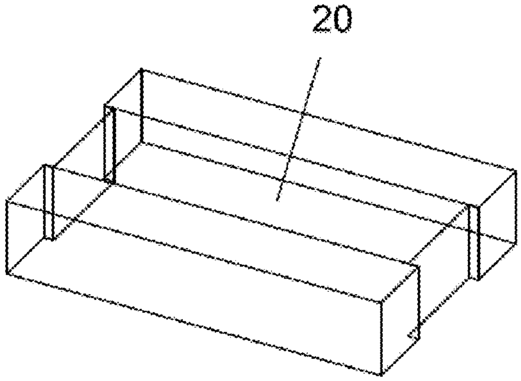
FIG. 1B is a structurally schematic view of a magnetic core according to an embodiment of the present invention.

As shown in FIG. 1B, a ferrite I-shaped magnetic core 20 may be manufactured by a compression molding or injection molding process, the ferrite core preferably has a magnetic permeability of 3000-5000, and a saturation magnetic flux of 400-500 mT; and a center post of the magnetic core is slotted, a slot size is in clearance fit with the wire base part 101, and a preferred fit clearance is greater than 0.10 mm.

The magnetic core 20 can be made of ferrite or metal soft magnetic materials according to actual manufacturing requirements and product performance, and the shape can be changed arbitrarily. The magnetic core may be fabricated using any known production process, and be preferably subjected to one-step forming by a molding process.

The conductor 10 and the magnetic core 20 may be arranged in such a way that conductor windings are formed by folding and arrangement of the conductor in situ on the magnetic core. Another way is to form the conductor by one step and then place the conductor on a prefabricated core to form a winding.

Figure 1C:
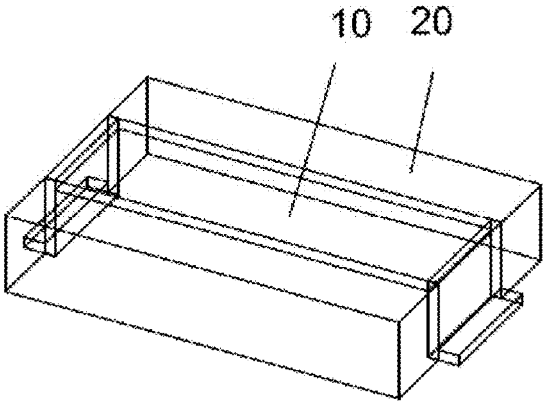
FIG. 1C is a structurally schematic view of an assembly part in which a conductor is placed in a magnetic core according to an embodiment of the present invention.

As shown in FIG. 1C, the conductor 10 is assembled on the magnetic core 20. Preferably, bottom lower surfaces of the electrode parts 103, 105 are at the same level as a bottom lower surface of the prefabricated magnetic core 20. When injection molding is carried out, the magnetic core needs to be fixed, so that the movement of the magnetic core during injection molding is avoided. In this embodiment, the magnetic core is fixed by adhesive paper. When the electrode and the magnetic core are on the same horizontal plane, it is conducive to the fixation of the assembly (10+20).

Figure 1D:
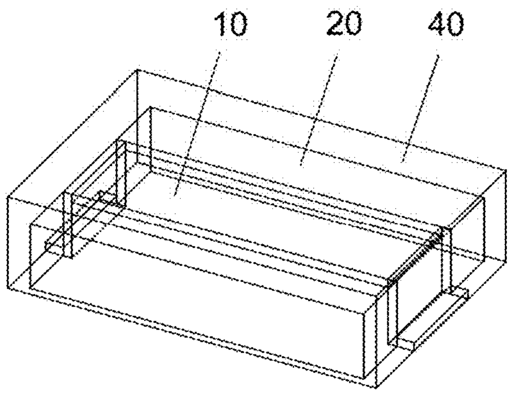
FIG. 1D is a structurally schematic view of a product with a formed magnetic molding package layer according to an embodiment of the present invention.

FIG. 1D is a schematic view showing a finished inductor after the magnetic molding package layer 40 covers the conductor 10 and the magnetic core 20. The magnetic powder contained in the magnetic molding package layer 40 is preferably iron-silicon-chromium powder graded according to different particle sizes, the particle size is 1-50 μm, and the solid content of the magnetic powder of the magnetic molding compound is preferably 80-97 wt %; the organic binder is preferably silicon resin, and the content is preferably 3-20 wt %; and the curing agent is preferably an amino resin, and the amount of the curing agent is preferably 6 wt % of the silicone resin content. By using the magnetic molding compound prepared, the magnetic molding package layer 40 is formed on the periphery of the magnetic core conductor assembly by a molding process, the molding pressure is preferably 100-300 MPa, and then the organic components of the molding package layer are preferably cured by baking at 100° C./1H.

In an embodiment of the invention, the conductor has an arcuate shape; the magnetic core is a cuboid, the base part and the side enclosing part are positioned on the groove body at the upper surface of the cuboid, and the electrode part extends away from the cuboid.

As shown in FIGS. 2A-2D, the conductor 10 has an arcuate shape; the magnetic core 20 is a cuboid, the base part 101 is positioned on the groove body at the upper surface of the cuboid, the side enclosing parts 102 and 104 are positioned on the groove bodies at a first side face and a second side face of the cuboid opposite to each other, the lower surfaces of the electrode parts 103 and 105 are coplanar with the lower surface of the magnetic core 20, and the electrode parts 103, 105 extend away from a third side face and a fourth side face, respectively. The third side face and the fourth side face are adjacent surfaces of the first side face and the second side face, respectively.

Similarly, a tin layer having a thickness of 3-8 μm is included outside the electrode part; or a nickel layer having a thickness of 0.3-1.3 μm and a tin layer having a thickness of 6-8 μm are sequentially included outside the electrode part.

Figure 2A:
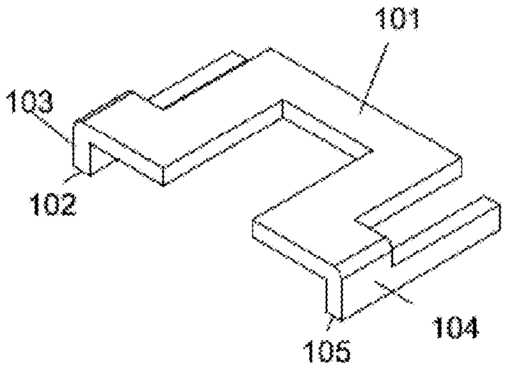
FIG. 2A is a structurally schematic view of an arcuate conductor according to an embodiment of the present invention.
Figure 2B:
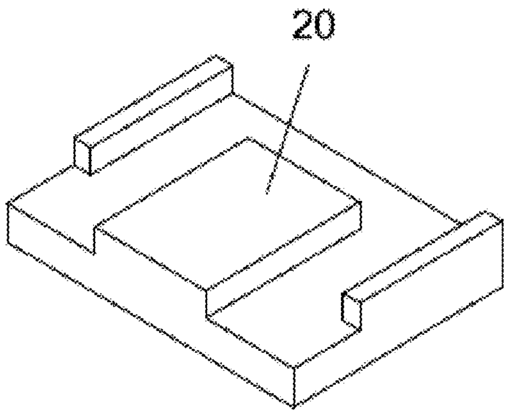
FIG. 2B is a structurally schematic view of another magnetic core according to an embodiment of the present invention.

As shown in FIG. 2B, a special-shaped magnetic core 20 made from a FeSiAl material is manufactured by a one-step press molding process, the magnetic permeability of the alloy magnetic core is preferably 30-100, the saturation magnetic flux is 1000-1500 mT, and the preferred fit clearance is 0.05-0.15 mm.

Figure 2C:
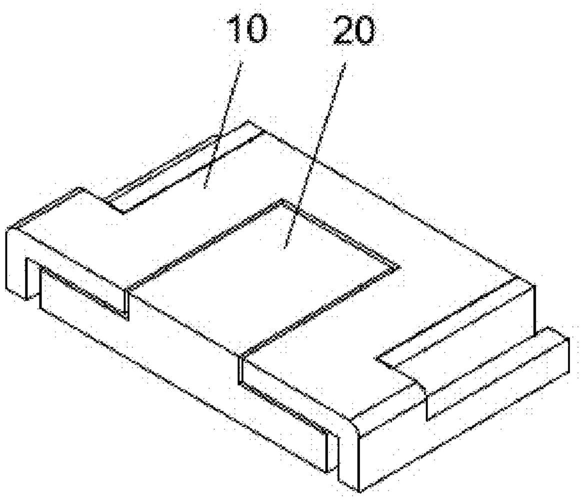
FIG. 2C is a structurally schematic view of another assembly part in which a conductor is placed in a magnetic core according to an embodiment of the present invention.

As shown in FIG. 2C, the conductor 10 is assembled on the magnetic core 20. Preferably, the bottom lower surfaces of the electrode parts 103 and 105 are at the same level as the bottom lower surface of the prefabricated magnetic core 2.

Figure 2D:
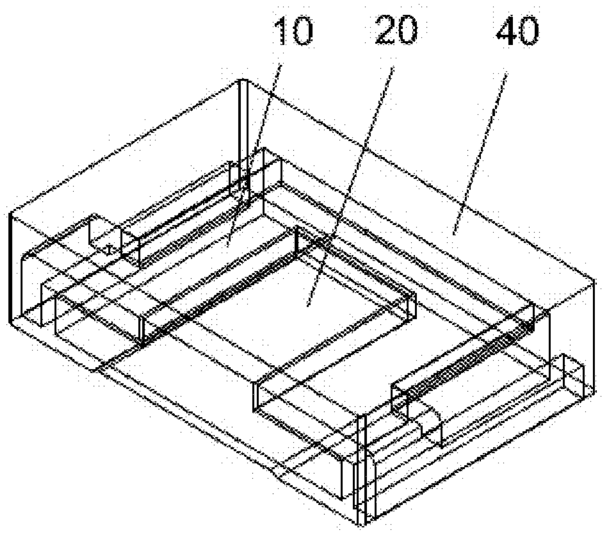
FIG. 2D is a structurally schematic view of another magnetic molding package layer formed product according to an embodiment of the present invention.

FIG. 2D is a schematic view of a finished inductor after the magnetic molding layer 40 covers the conductor 10 and the magnetic core 20. The magnetic powder contained in the magnetic molding package layer 40 is preferably carbonyl iron powder, the particle size is 1-50 μm, and the solid content of the magnetic powder of the magnetic molding compound is preferably 60-80 wt %; the organic binder is preferably silicon resin, and the content is preferably 3-20 wt %; and the curing agent is preferably an amino resin, and the amount of the curing agent is preferably 6 wt % of the silicone resin content. By using magnetic molding compounds prepared, the magnetic molding package layer 40 is formed on the periphery of the magnetic core conductor assembly by a molding process, the molding pressure is preferably 1-100 MPa, and then the organic components of the molding package layer are preferably cured by baking at 150° C./1H.

In an embodiment of the invention, the magnetic core is a metal material, and the magnetic molding package layer is a metal material; or the magnetic core is a ferrite material, and the magnetic molding package layer is a metal material. In an embodiment of the invention, the magnetic molding package layer is FeSiCr/FeSi or the like.

Based on a design structure with the material combination and optimization combination, when the equivalent magnetic permeability is 60 or more, the equivalent saturation magnetic flux density can be 0.55 T or higher; and the space utilization rate is high to facilitate miniaturization of an inductor design.

Figure 3:
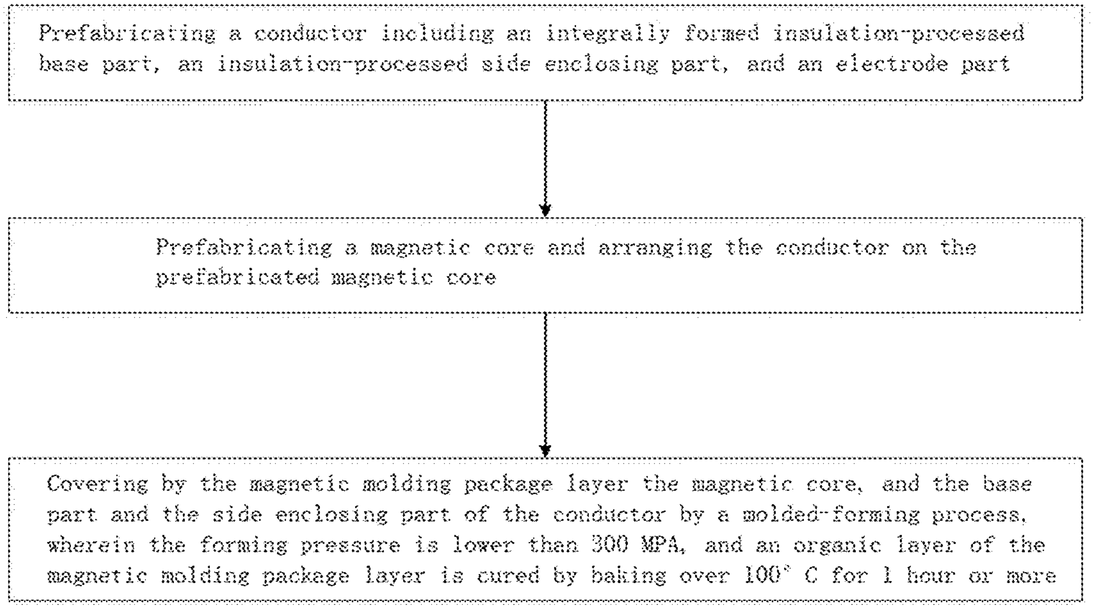
FIG. 3 is a schematic diagram of a method for manufacturing a molded-forming power inductor according to an embodiment of the present invention.

As shown in FIG. 3, a method for manufacturing a molded-forming power inductor comprises the steps of:

S1, prefabricating a conductor including an integrally formed insulation-processed base part, an insulation-processed side enclosing part, and an electrode part;

specifically, round wires, flat wires or metal sheets are selected as the conductors, and one or more processes of flattening, cutting, bending, stamping and the like are adopted to manufacture the conductors according to design requirements;

S2, prefabricating a magnetic core and arranging the conductor on the prefabricated magnetic core;

S3, covering by the magnetic molding package layer the magnetic core, and the base part and the side enclosing part of the conductor by a molded-forming process, wherein the forming pressure is lower than 300 MPA, and an organic layer of the magnetic molding package layer is cured by baking over 100° C. for 1 hour or more.

Specifically, the magnetic core is an I-shaped magnetic core or a special-shaped magnetic core matched with the conductor, and the magnetic core is manufactured by a compression molding or injection molding process.

In the step S1, the prefabricated conductor, the conductor base and the electrode are integrated, the inductor takes two ends of the conductor as the electrodes, and the bottom electrode of the conductor can be further flattened to increase the area of a bonding pad. In the Step S2, the manufactured conductor is firstly assembled on a center post of the magnetic core or embedded into a magnetic core groove body matched with the shape and size of the conductor, wherein the size of the groove body is matched with the conductor; in the Step S3, the magnetic molding package layer covers the magnetic core and the conductor by a molded-forming process; the magnetic core can be completely covered or partially covered during the covering, and end faces of two ends or two ends of the leading-out end of the conductor serve as electrodes and are exposed outside the magnet.

Compared with the traditional assembled magnetic core type power inductor, the power inductor disclosed by the invention has the advantages of better comprehensive electrical characteristics, higher magnet utilization rate and higher reliability.

The power inductor has the advantages of being small in EMI, high in reliability, large in saturation current and small in direct-current resistance, is a structure design with a combined magnetic core without a magnetic core gap. When the equivalent magnetic permeability Ui is 60 or more, the equivalent saturation magnetic flux density Bs can be 0.55 T or higher, which is higher than that of an integrally formed power inductor under the same condition, and the effective saturation magnetic flux density Bs of the latter one can only be 0.45 T or higher.

The power inductor is suitable for digital cameras, mobile phones, computers, televisions, set-top boxes, game machines, automobile electronics, LED illuminating lamps, and other electronics.

The content above is a further detailed description of the invention in connection with specific preferred embodiments, and is not to be taken as limiting the invention to the specific embodiments described. It will be apparent to those skilled in the art that various equivalents and obvious variations with the same performance or purpose can be made without departing from the idea of the invention, and shall be deemed to fall within the scope of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A molded-forming power inductor, comprising a conductor, a magnetic core and a magnetic molding package layer;

wherein the conductor comprises an integrally formed insulation-processed base part, an insulation-processed side enclosing part and an electrode part, the base part and the side enclosing part are assembled with the magnetic core in a gapless fit mode, and the magnetic molding package layer is gaplessly wrapped outside the conductor and the magnetic core;

the conductor has a Ωshape;

the magnetic core is a cuboid, the base part is positioned on a groove body at an upper surface of the cuboid;

the side enclosing parts are respectively positioned on a first side face and a second side face of the cuboid, opposite to each other, a lower surface of the electrode part is coplanar with a lower surface of the magnetic core, and;

the upper surface of the magnetic core is provided with a central protrusion and two lateral protrusions on either side, with a first gap and a second gap respectively existing between the front surfaces of the two lateral protrusions and the front surface of the magnetic core, a third gap exists between the rear surface of the central protrusion and the rear surface of the magnetic core, and a fourth gap and a fifth gap respectively exist between the two lateral protrusions and the central protrusion, the first gap, the fourth gap, the third gap, the fifth gap, and the second gap are sequentially connected on the upper surface of the magnetic core to form an arcuate shape groove, the base of the conductor has an arcuate shape to fit gaplessly within the arcuate shape groove, the ends of the base extend through the first and second gaps to the outside of the upper surface of the magnetic core, and then bend downward to the first and second side faces of the magnetic core to form the side enclosing parts, respectively, each side enclosing part has an extension part that extends along the first and second side faces from the front surface to the rear surface of the magnetic core, and the extension parts form the electrode part.

2. The molded-forming power inductor according to claim 1, wherein a tin layer having a thickness of 3-8 μm is included outside the electrode part; or a nickel layer having a thickness of 0.3-1.3 μm and a tin layer having a thickness of 6-8 μm are sequentially included outside the electrode part.

3. The molded-forming power inductor according to claim 1, wherein the magnetic core is a metal material, and the magnetic molding package layer is a metal material; or the magnetic core is a ferrite material, and the magnetic molding package layer is a metal material.

* * * * *